(12) United States Patent
Criscione, II et al.

(10) Patent No.: US 8,137,168 B2
(45) Date of Patent: *Mar. 20, 2012

(54) SHACKLE WITH PIVOT FEATURE & CONVEYOR SYSTEM THEREFOR

(75) Inventors: Frank J. Criscione, II, Kansas City, MO (US); William Randall Armstrong, Kansas City, MO (US)

(73) Assignee: Johnson Food Equipment, Inc., Kansas City, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 12/857,390

(22) Filed: Aug. 16, 2010

(65) Prior Publication Data

US 2010/0304653 A1    Dec. 2, 2010

Related U.S. Application Data

(63) Continuation of application No. 12/200,321, filed on Aug. 28, 2008, now Pat. No. 7,789,739, which is a continuation of application No. 11/680,769, filed on Mar. 1, 2007, now Pat. No. 7,422,517.

(60) Provisional application No. 60/781,130, filed on Mar. 10, 2006.

(51) Int. Cl.
*A22C 21/00* (2006.01)
(52) U.S. Cl. ........................................ 452/188
(58) Field of Classification Search .......... 452/177–180, 452/182–184, 187–192, 198
See application file for complete search history.

(56) References Cited

U.S. PATENT DOCUMENTS

| 3,686,712 | A | * | 8/1972 | Lewis | 452/179 |
| 4,282,633 | A | * | 8/1981 | Graham et al. | 452/177 |
| 4,498,578 | A | * | 2/1985 | Altenpohl | 198/680 |
| 4,524,488 | A | * | 6/1985 | van den Bogert | 452/167 |
| 4,972,549 | A | * | 11/1990 | Van Den Nieuwelaar et al. | 452/178 |
| 5,092,815 | A | * | 3/1992 | Polkinghorne | 452/179 |
| 5,487,700 | A | * | 1/1996 | Dillard | 452/188 |
| 5,875,738 | A | * | 3/1999 | Hazenbroek et al. | 119/716 |
| 6,017,269 | A | * | 1/2000 | Altenpohl, III | 452/188 |
| 6,375,560 | B1 | * | 4/2002 | Verrijp | 452/187 |
| 6,830,508 | B2 | * | 12/2004 | Hazenbroek et al. | 452/188 |

* cited by examiner

*Primary Examiner* — Richard Price, Jr.
(74) *Attorney, Agent, or Firm* — Spencer Fane Britt & Browne LLP

(57) ABSTRACT

A device (10) for retaining and associating an animal with a transport system during transport to and through one or more processing operations along a processing line. The device (10) includes a pivot mechanism (12) for reliably controlling the orientation of the animal during upward and downward travel on the transport system. More specifically, the device includes a lower portion (14) for retaining the animal, and an upper portion (16) for coupling with the transport system. The lower portion (14) is pivotably coupled with the upper portion (16) and movable between a first position in which the lower portion (14) and the upper portion (16) are in a substantially straight orientation relative to each other, and a second position in which the lower portion (14) and the upper portion (16) are in a substantially angled orientation relative to each other in the forward direction.

11 Claims, 13 Drawing Sheets

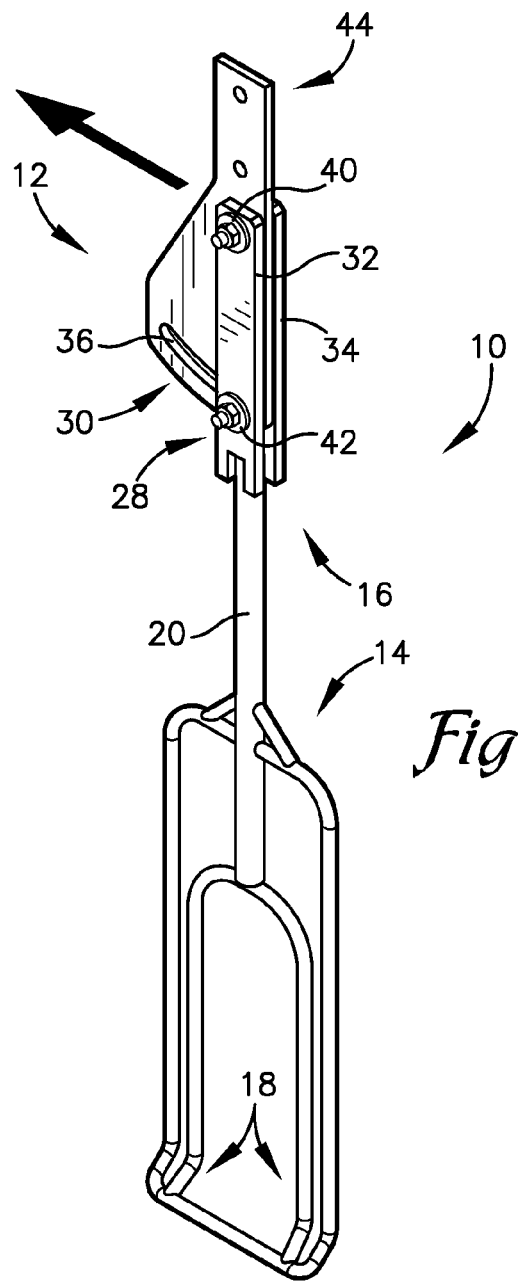
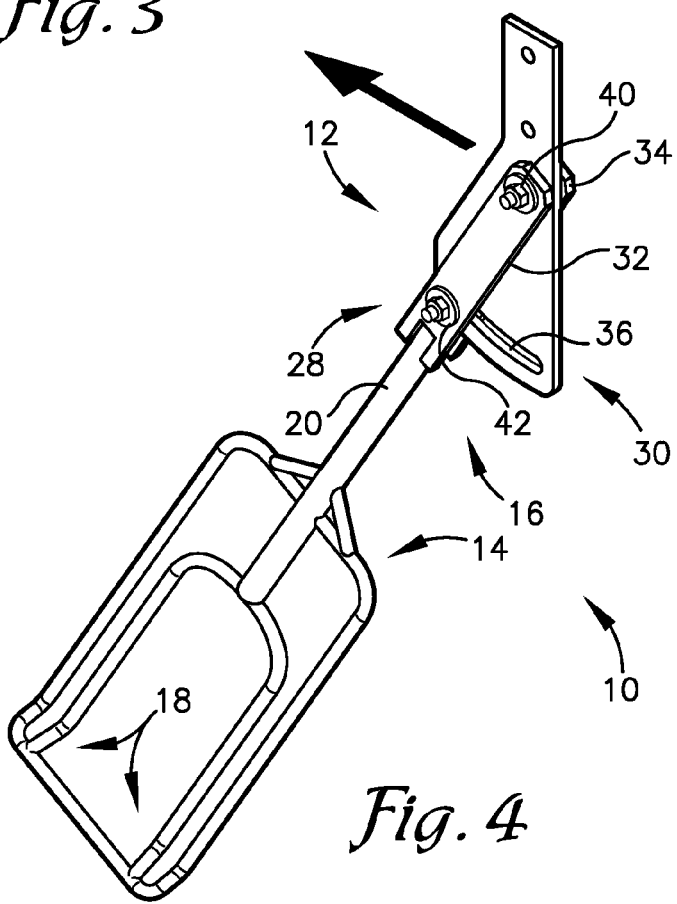
Fig. 3
Fig. 4

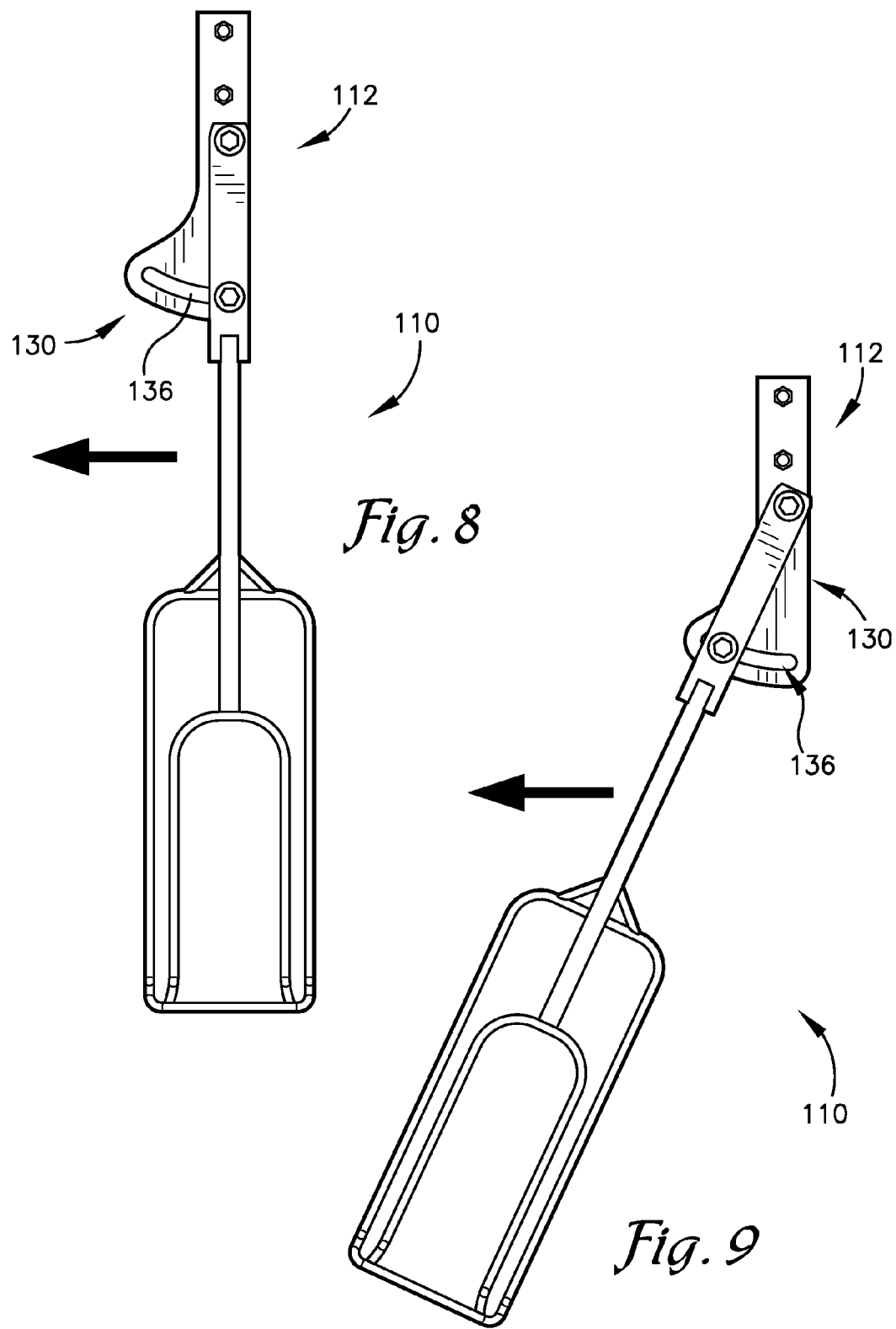

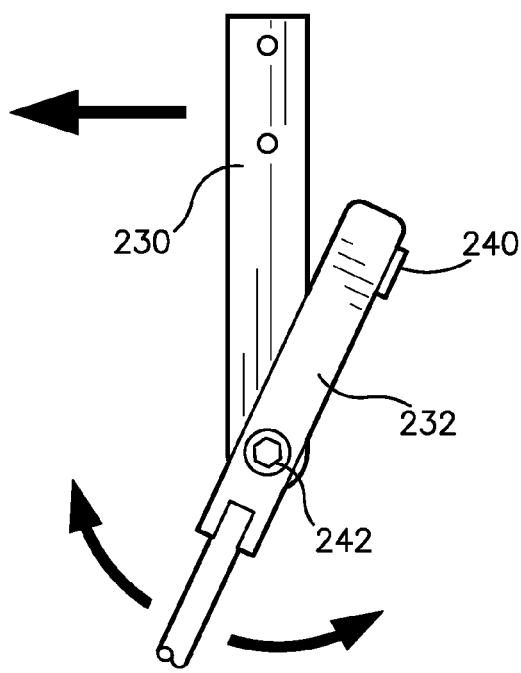 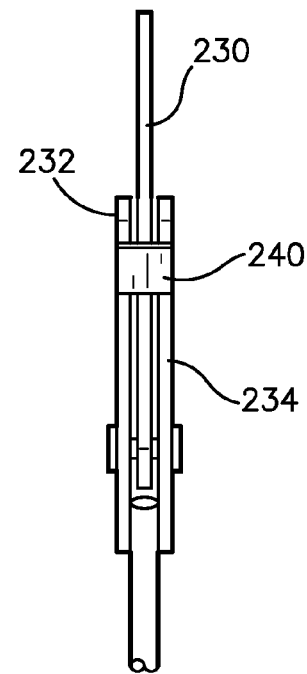
*Fig. 12A*  *Fig. 12B*
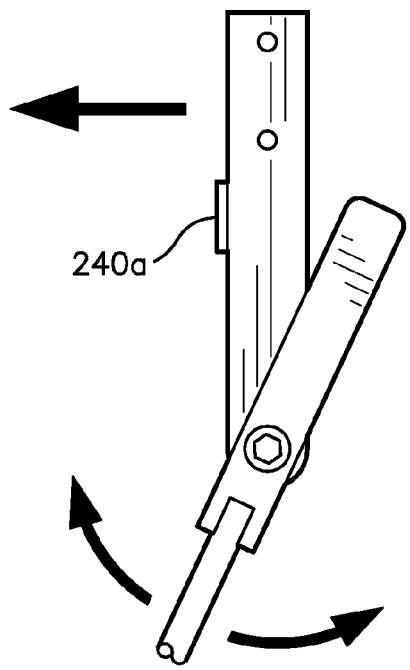 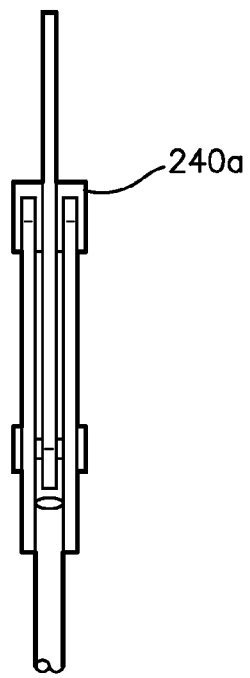
*Fig. 13A*  *Fig. 13B*

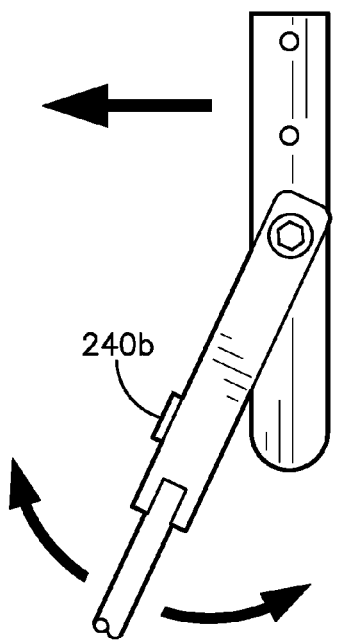 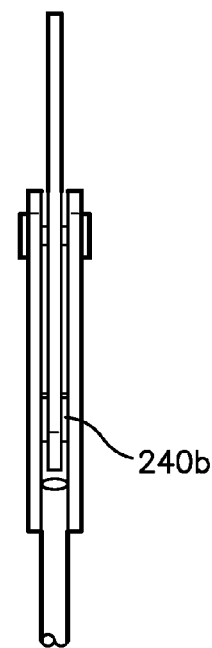
*Fig. 14A*  *Fig. 14B*
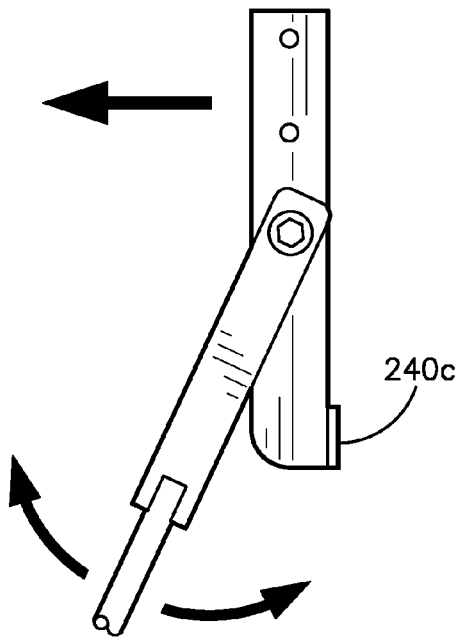 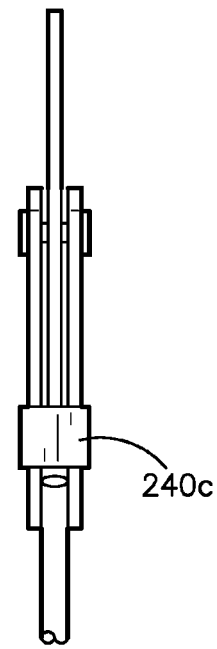
*Fig. 15A*  *Fig. 15B*

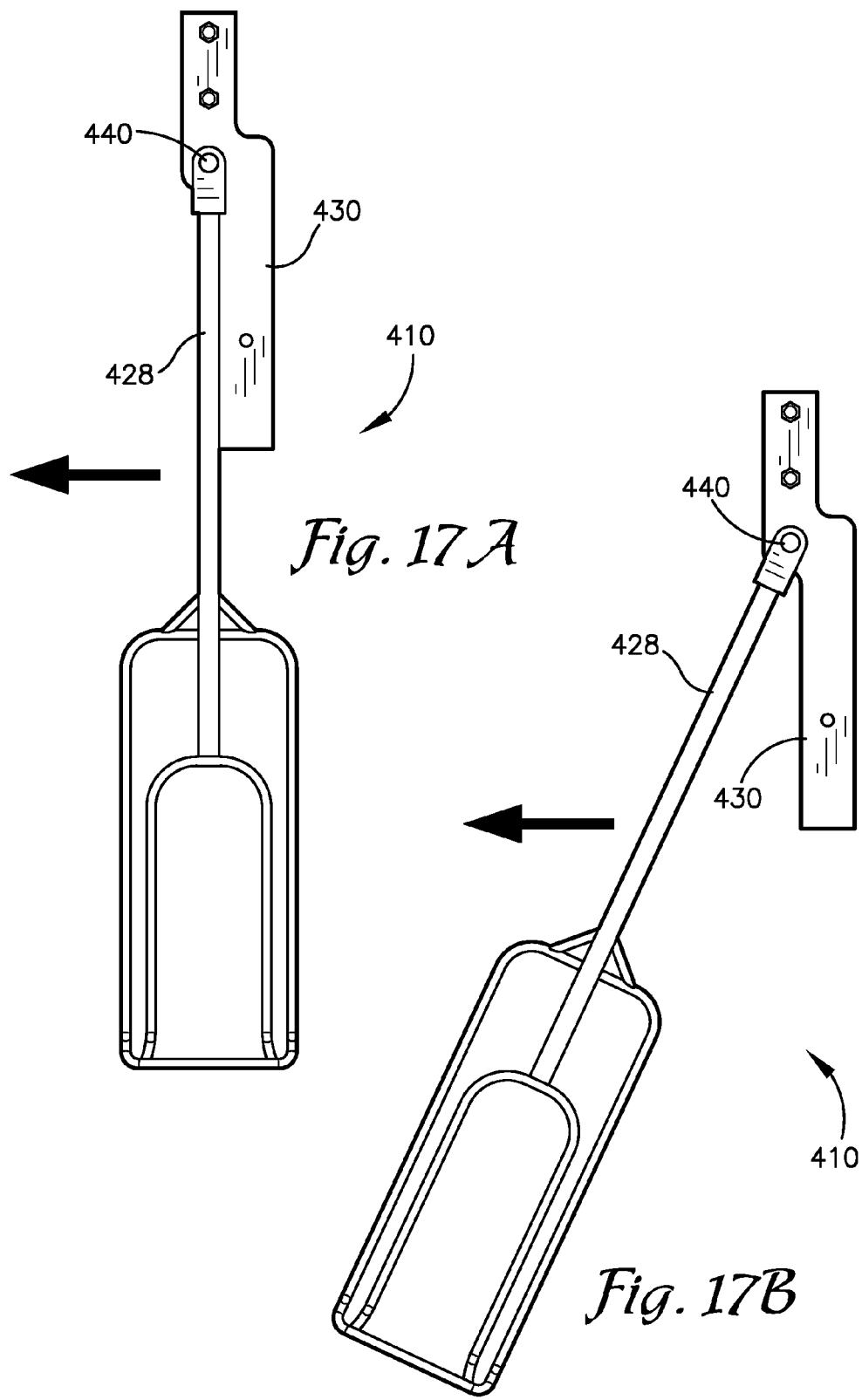

US 8,137,168 B2

SHACKLE WITH PIVOT FEATURE & CONVEYOR SYSTEM THEREFOR

RELATED APPLICATIONS

The present non-provisional patent application is a continuation patent application of application Ser. No. 12/200,321, filed Aug. 28, 2008, entitled SHACKLE WITH PIVOT FEATURE, now U.S. Pat. No. 7,789,739, issued Sep. 7, 2010, which application is a continuation patent application of application Ser. No. 11/680,769, filed Mar. 1, 2007, now U.S. Pat. No. 7,422,517, issed Sep. 9, 2008, which claims priority benefit of earlier-filed provisional patent application also having the same title, Ser. No. 60/781,130, filed Mar. 10, 2006. All identified earlier-filed applications are hereby incorporated by reference into the present continuation application.

FIELD OF THE INVENTION

The present invention relates to devices, such as poultry shackles, for retaining and associating an animal with a transport system, such as a conveyor, during transport to and through one or more processing operations along a processing line. More specifically, the present invention concerns such a device having a pivot mechanism for reliably controlling the orientation of the animal during upward and downward travel on the conveyor system so as to both avoid interference with adjacent animals and maximize the efficacy of the processing operations.

BACKGROUND OF THE INVENTION

In the processing of animals, particularly poultry, the animals are typically transported to and through various processing operations along a processing line. At least some of these processing operations are automated. The animals are suspended from shackles which are, in turn, coupled with a conveyor for transporting the animals relatively rapidly along the processing line. The shackles generally depend vertically from the conveyor so as to be substantially parallel with one another.

Referring to FIGS. 1 and 2 (PRIOR ART), it is sometimes necessary to raise or lower the processing line relative to other portions of the processing line. When it is necessary to raise the processing line, the conveyor slopes upwardly. A convex radius connects the previous lower portion of the conveyor with the upwardly sloping portion. As the shackles travel along this convex radius their relative orientation changes, such that they are no longer parallel to one another. More specifically, they are oriented angularly to one another along radial lines extending outwardly from a center point of the convex radius, such that the lower portions of the shackles, which are opposite the connections with the conveyor, spread apart. Because this change in orientation does not result in physical contact or interference between adjacent animals, it is generally not necessary to prevent it.

When it is necessary to lower the processing line, the conveyor slopes downwardly. A concave radius connects the previous higher portion with the downward sloping portion. As the shackles travel along this concave radius their relative orientation changes, such that they are no longer parallel to one another. More specifically, they are oriented angularly to one another along radial lines extending inwardly toward a center point of the concave radius, such that the lower portions of the shackles, which are opposite the connections with the conveyor, move closer together. This change in orientation can result in physical contact or interference between adjacent animals.

Additionally, even when traveling generally horizontally through the various processing operations, such as scalding and de-feathering operations, some resistance, or rearward force, may result which tends to push the animals backward and changes their orientation. This can cause a number of problems, including that the changed orientation may reduce the efficacy of the processing operations.

One solution to the last two problems is to incorporate a pivot mechanism into each shackle and to attach a chain or other linkage extending between a point on the shackle which is below the pivot mechanism and a point on an adjacent shackle which is above its pivot mechanism. In this manner, when the shackle travels along the concave radius, the pivot mechanism allows the shackle to pivot about the pivot mechanism, and thereby allows the change in orientation. When the shackle travels along the convex radius, or when the shackle travels horizontally and the animal experiences resistance, the chain prevents the shackle from pivoting, or from pivoting beyond a particular amount, about the pivot mechanism, and thereby controls the change in orientation.

Unfortunately, the prior art pivot mechanism is prone to failure and disconnection. When this occurs, the shackle remains connected to the conveyor by the chain or other linkage. As a result, the improperly suspended and positioned shackle impedes or otherwise interferes with the processing operations, and can damage the processing apparatuses. Furthermore, removing or repairing the shackle takes time, during which the processing operations must be stopped.

SUMMARY OF THE INVENTION

The present invention provides a device for retaining and associating an animal with a transport system during transport to and through one or more processing operations along a processing line. The device includes a pivot mechanism for reliably controlling the orientation of the animal during upward and downward travel on the transport system. In one embodiment, the device is a shackle having stirrups, the animal is a poultry animal, and the transport system is a conveyor system.

In one embodiment, the device includes a lower portion for retaining the animal, and an upper portion for coupling with the transport system. The lower portion is pivotably coupled with the upper portion and movable between a first position in which the lower portion and the upper portion are in a substantially straight orientation relative to each other, and a second position in which the lower portion and the upper portion are in a substantially angled orientation relative to each other in the forward direction.

In one embodiment, the lower portion and the upper portion physically cooperate to define at least the rearward position. In one embodiment, the first position and the second position may be defined by a channel, and the difference between the straight orientation and the angled orientation may be approximately between 15 degrees and 45 degrees. In one embodiment at least one position is defined by a stop. In one embodiment, at least one position is defined by a forward surface of the lower component contacting a rearward surface of the upper component. In one embodiment, at least one position is defined by a leg which extends outwardly and upwardly from the lower portion to contact a portion of the transport system.

These and other features of the present invention are discussed in detail below in the section titled DETAILED DESCRIPTION OF THE INVENTION.

BRIEF DESCRIPTION OF THE DRAWING FIGURES

Reference is made herein to the accompanying drawings figures, which are as follows:

FIG. 3 is an isometric view of a first embodiment of the shackle in a straight orientation corresponding to a first position;

FIG. 4 is an isometric view of the shackle of FIG. 3 in an angled orientation corresponding to a second position;

FIG. 8 is an elevation view of a second embodiment of the shackle in the straight orientation;

FIG. 9 is an elevation view of the shackle of FIG. 8 in the angled orientation;

FIG. 12A is a fragmentary side elevation view of an upper portion of the shackle of FIGS. 10 and 11;

FIG. 12B is a fragmentary rear elevation view of the upper portion of the shackle of FIG. 12A;

FIG. 13A is a fragmentary side elevation view of an upper portion of a second version of the shackle of FIGS. 10 and 11;

FIG. 13B is a fragmentary rear elevation view of the second version of FIG. 13A;

FIG. 14A is a fragmentary side elevation view of an upper portion of a third version of the shackle of FIGS. 10 and 11;

FIG. 14B is a fragmentary rear elevation view of the third version of FIG. 14A;

FIG. 15A is a fragmentary side elevation view of an upper portion of a fourth version of the shackle of FIGS. 10 and 11;

FIG. 15B is a fragmentary rear elevation view of the fourth version of FIG. 15A;

FIG. 17A is a side elevation view of a fifth embodiment of the shackle in the straight orientation;

FIG. 17B is a side elevation view of the shackle of FIG. 17A in the angled orientation;

DESCRIPTION OF THE INVENTION

Figure 1:
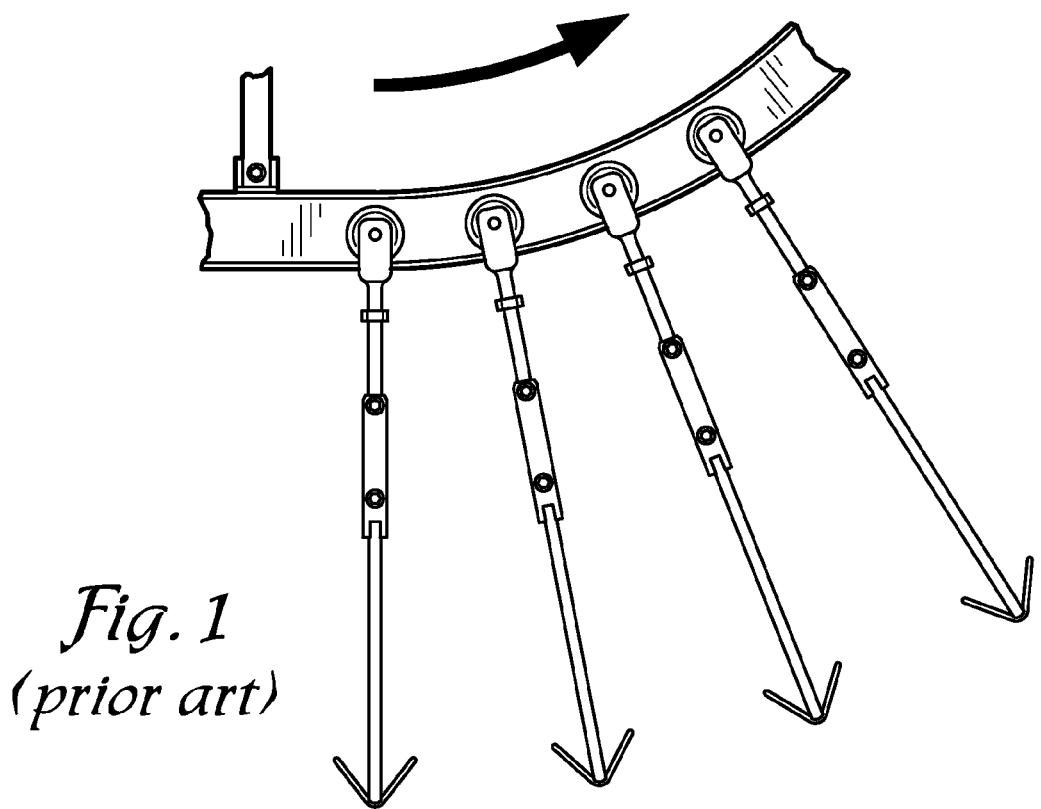
FIG. 1 (PRIOR ART) is an elevation representation of shackles traveling along a convex path.
Figure 2:
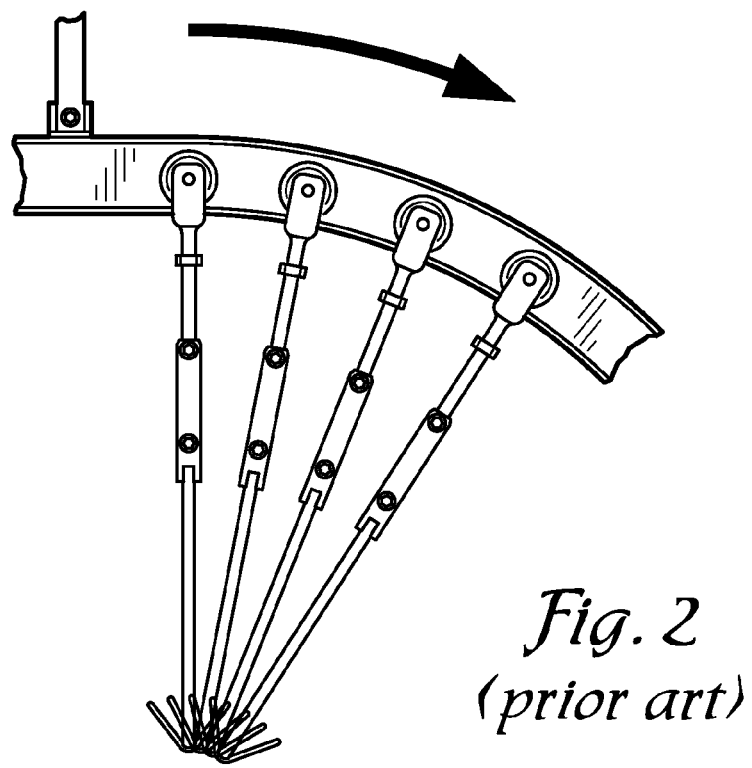
FIG. 2 (PRIOR ART) is an elevation representation of shackles traveling along a concave path.

With reference to the figures, An improved shackle 10 is herein described, shown, and otherwise disclosed in accordance with a preferred embodiment of the present invention. Broadly, the shackle 10 incorporates an improved pivot mechanism 12 for more reliably controlling the orientation of the animal during upward and downward travel on the conveyor system so as to both avoid interference with adjacent animals and maximize the efficacy of the processing operations.

Broadly, the shackle 10 retains and associates an animal, such as a poultry animal, e.g., chicken, duck, goose, turkey, with a conveyor or other transport system for transporting the animal along a processing line in which the processing operations occur. In one embodiment, referring to FIGS. 3 and 5, the shackle 10 broadly comprises a lower portion 14 and an upper portion 16. The lower portion 14 includes first and second spaced-apart stirrups 18 for receiving and retaining the legs of the animal. The upper portion 16 includes a suspension member 20 and the pivot mechanism 12. The suspension member 20 is an elongated rod extending between and connecting the lower portion 14 of the shackle 10 and the pivot mechanism 12.

The pivot mechanism 12 broadly includes an outer component 28 and an inner component 30. The outer component 28 includes first and second elongated members 32,34 which are oriented parallel to and spaced apart from one another, which are fixedly connected, such as by welding, at a lower end to the suspension member 20, and which present upper and lower aligned holes. The inner component 30 is received between the spaced-apart first and second elongated members 32,34, and presents an upper hole and a lower channel 36 which correspond, respectively, to the upper and lower aligned holes of the outer component 28. The lower channel 36 is an elongated arcing channel approximately between 15 degrees and 45 degrees or more in one embodiment, and approximately between 25 degrees and 45 degrees or more in another embodiment. An upper bolt 40 extends through the aligned and corresponding upper holes, and a lower bolt 42 extends through the aligned lower hole and lower channel 36, to couple the outer and inner components 28,30 together in a pivoting relationship. More specifically, the outer components 28 are free to move upon the upper bolt 40; and the lower bolt is free to move within the confines of the lower channel 36 between a first position, as shown in FIG. 3, which corresponds to a straight orientation of the shackle 10, and a second position, as shown in FIG. 4, which corresponds to an angled orientation of the shackle 10. An upper portion 44 of the inner component 30 presents one or more spaced-apart holes for coupling the shackle 10 with the conveyor. In one embodiment, at least one of the one or more of these holes is an elongated channel or is otherwise enlarged to allow for accommodating different connection spacings on the conveyor.

In one embodiment, all or portions of the shackle 10 are at least partly constructed from a metal material or combination of such materials, such as carbon or stainless steel. In another embodiment, all or portions of the shackle 10 are at least partly constructed from a natural or synthetic material or combination of such materials, such as rubber, nylon, plastic, or fiberglass.

Figure 5:
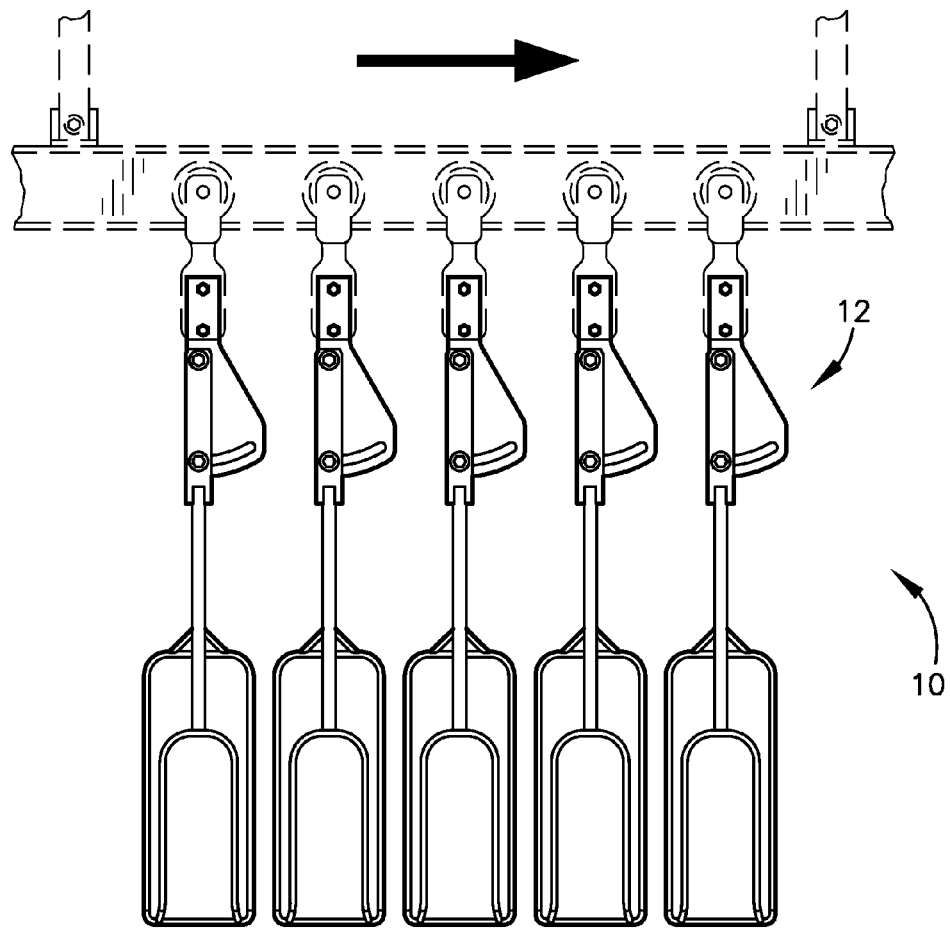
FIG. 5 is an elevation view of multiple instances of the shackle of FIG. 3 moving in a horizontal direction, wherein the shackles are shown in the straight orientation.
Figure 6:
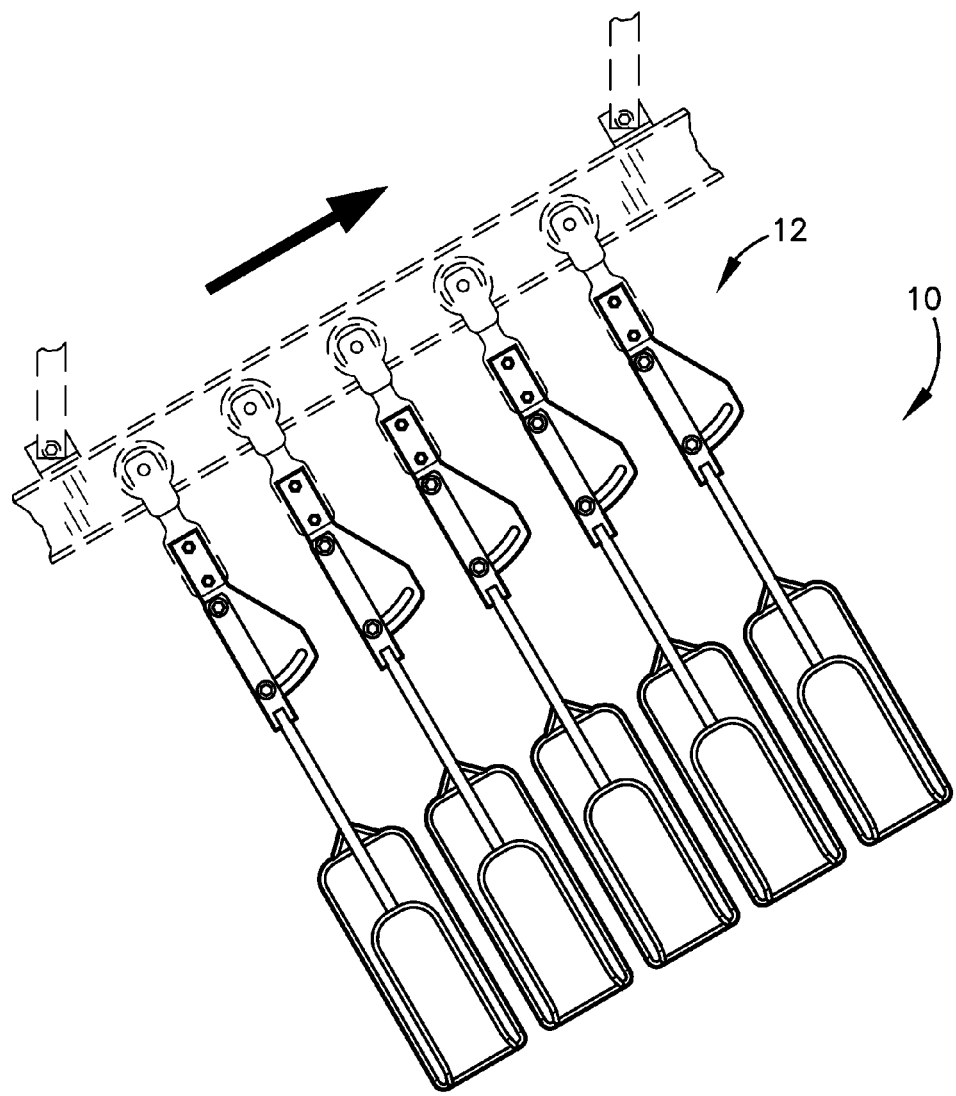
FIG. 6 is an elevation view of multiple instances of the shackle of FIG. 3 moving in an upward direction, wherein the shackles are shown in the straight orientation position.
Figure 7:
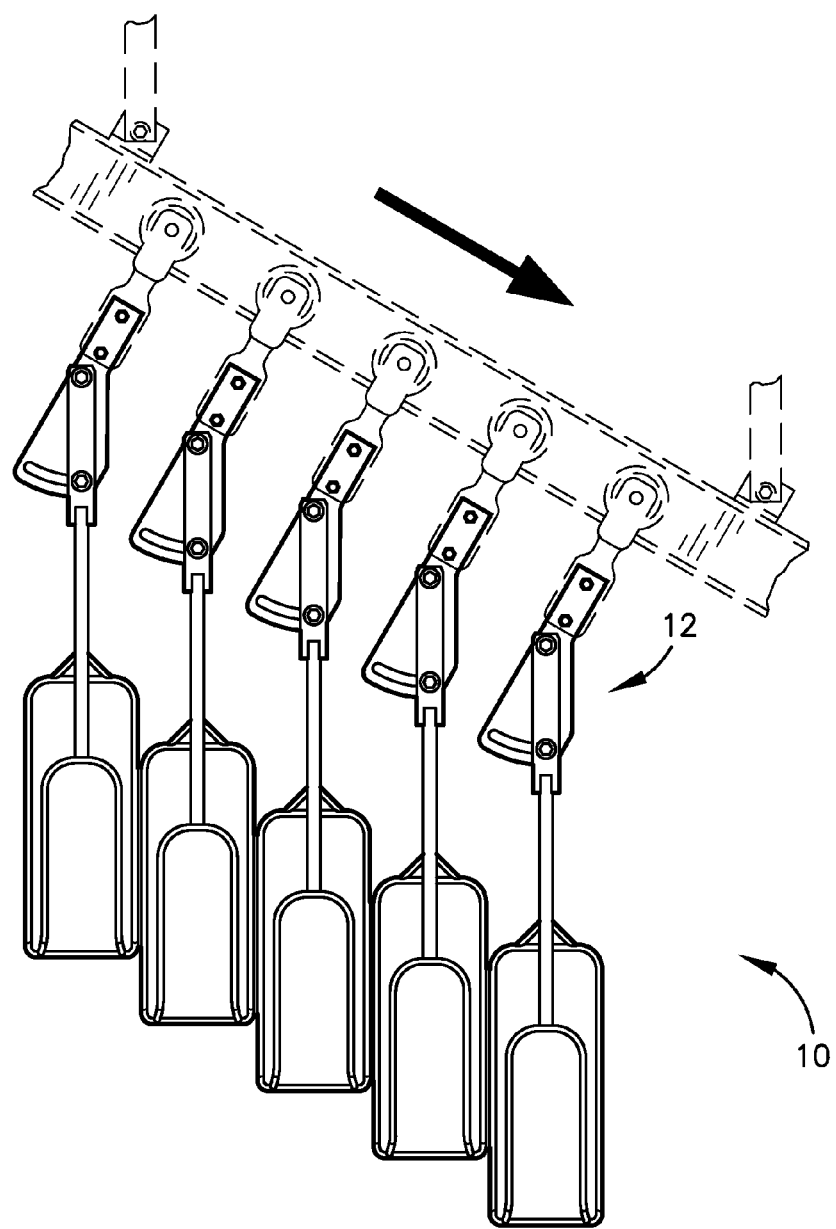
FIG. 7 is an elevation view of multiple instances of the shackle of FIG. 3 moving in a downward direction, wherein the shackles are shown in the angled orientation.

Illustrative operation of the shackle 10, particularly operation of the pivot mechanism 12, is shown in FIGS. 5, 6, 7, and 19. Referring particularly to FIG. 5, the shackle 10 substantially prevents an undesirable change in orientation rearwardly, i.e., opposite the direction of travel, due to resistance or other rearward force applied to the animals by the processing operations, and thereby maximizes the efficacy of the processing operations. Referring particularly to FIG. 6, the shackle 10 substantially prevents an undesirable change in orientation rearwardly due to travel in an upward direction. Referring particularly to FIG. 7, the shackle 10 allows for a desirable change in orientation forwardly due to travel in a downward direction, which maintains the animals in a more vertical orientation than they would otherwise be and thereby avoids interference with adjacent animals.

Referring also to FIGS. 8 and 9, a second embodiment of the shackle 110 is shown in which excess material has been removed from the inner component 130 of the pivot mechanism 112 to reduce weight and cost. Sufficient material is retained to define the channel 136.

Figure 10:
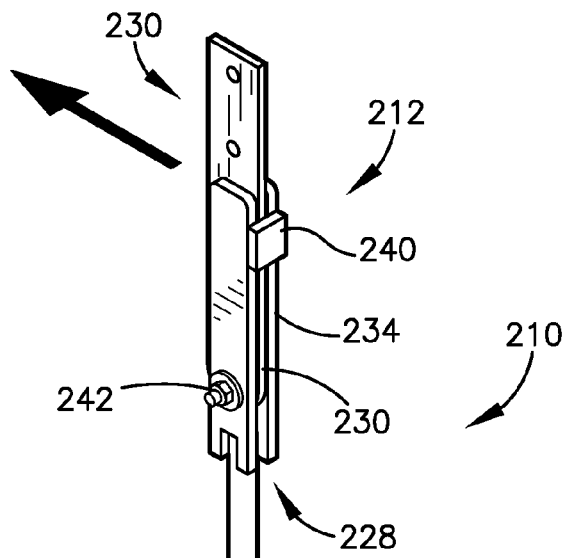
FIG. 10 is an elevation view of a third embodiment of the shackle in the straight orientation.
Figure 11:
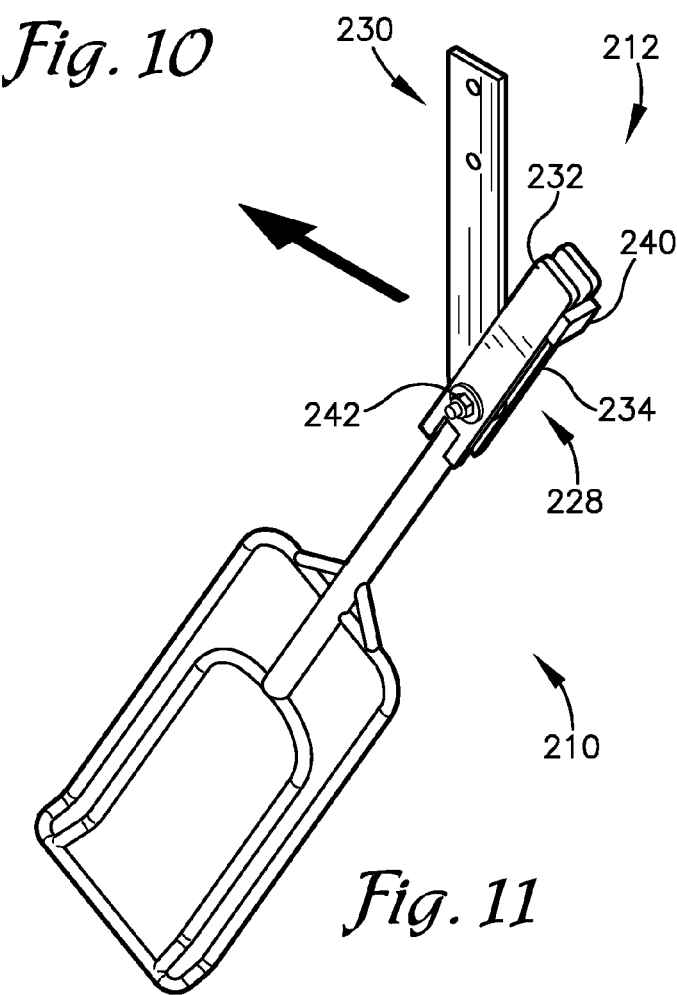
FIG. 11 is an elevation view of the shackle of FIG. 10 in the angled orientation position.

Referring also to FIGS. 10, 11, 12A, and 12B a third embodiment of the shackle 210 is shown in which the upper aligned and corresponding holes have been eliminated, and the lower channel of the inner component has been replaced with a lower hole. A stop 240 has been added extending perpendicularly between rearward portions of the first and second elongated members 232,234. The lower bolt 242 extends through the aligned and corresponding lower holes, to couple the outer and inner components 228,230 together. The outer and inner components 228,230 pivot independently about the lower bolt 242 between a rearward position in which the stop 240 rests against a rearward portion of the inner component 230, as shown in FIG. 10, and a forward position in which the stop 240 is spaced apart from the rearward portion of the inner component 230, as shown in FIG. 11.

Referring also to FIGS. 13A and 13B, 14A and 14B, and 15A and 15B, second, third, and fourth versions, respectively, of the shackle 210 of FIGS. 12A and 12B are shown in which either or both of the pivot point or stop 240a,240b,240c, is relocated, but which otherwise operate in substantially the same manner.

Figure 16A:
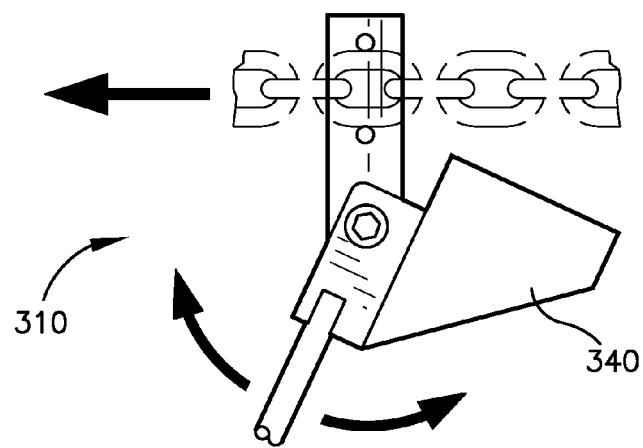
FIG. 16A is a fragmentary side elevation view of an upper portion of a fourth embodiment of the shackle in the angled orientation.
Figure 16B:
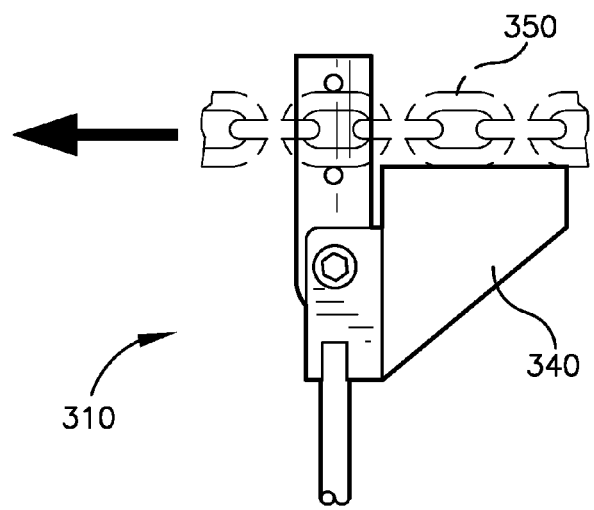
FIG. 16B is a fragmentary side elevation view of the shackle of FIG. 16A in the straight orientation.

Referring also to FIGS. 16A and 16B, a fourth embodiment of the shackle 310 is shown in which the stop is in the form of a leg 340 which extends outwardly and upwardly from the inner component 330. When the shackle 310 is in a substantially straight orientation, i.e., traveling level or along a convex curve, the leg 340 rides close to or against a horizontal member 350 associated with the conveyor, and when the shackle 310 is in an angled orientation, i.e., traveling along a concave curve, the stop 340 is spaced apart from the horizontal member 350.

Referring also to FIGS. 17A and 17B, a fifth embodiment of the shackle 410 is shown in which the inner component 430 serves as the stop. More specifically, the outer component 428 includes only a single elongated member which is coupled with the inner component by the upper bolt 440 at the pivot point. When the shackle 410 is in a substantially straight orientation, the rearward portion of the outer component 428 rests close to or against a forward portion of the inner component 430, as shown in FIG. 17A, and when the shackle 410 is in an angled orientation, the rearward portion of the outer component 428 is spaced apart from the forward portion of the inner component 430, as shown in FIG. 17B.

Figure 19A:
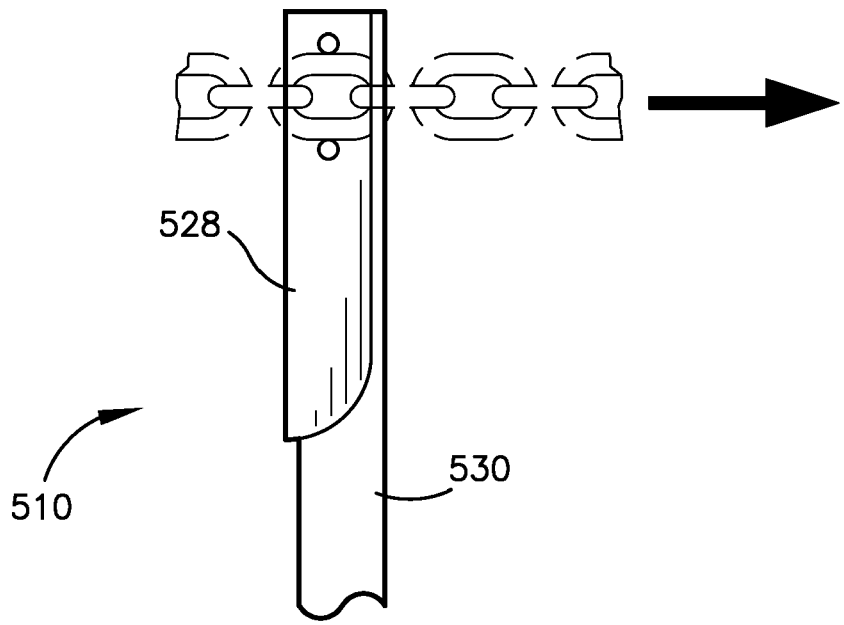
FIG. 19A is a fragmentary side elevation view of a sixth embodiment of the shackle in the straight orientation.
Figure 19B:
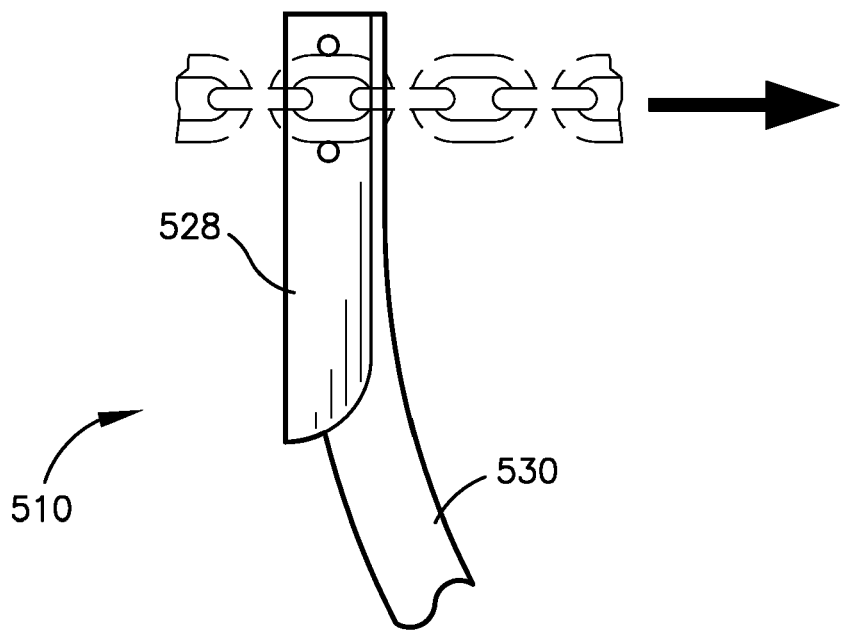
FIG. 19B is a fragmentary side elevation view of the shackle of FIG. 19A in the angled orientation.

Referring also to FIGS. 19A and 19B, a sixth embodiment of the shackle 510 is shown in which the inner component 530 is flexible and the outer component 528 is rigid. When the shackle 510 is in a substantially straight orientation, the rearward portion of the inner component 530 rests close to or against a forward portion of the outer component 528 substantially preventing flexure of the inner component 530 in the rearward direction, as shown in FIG. 19A. When the shackle 510 is in an angled orientation, the rearward portion of the inner component 530 is spaced apart from the forward portion of the outer component 528 as the inner component 530 flexes, or bends, toward the forward direction, as shown in FIG. 19B. Thus, the flexible inner component 530 is allowed to flex, or bend, in the forward direction but not in the rearward direction, thereby accomplishing the same functionality as the previous embodiments.

Figure 18:
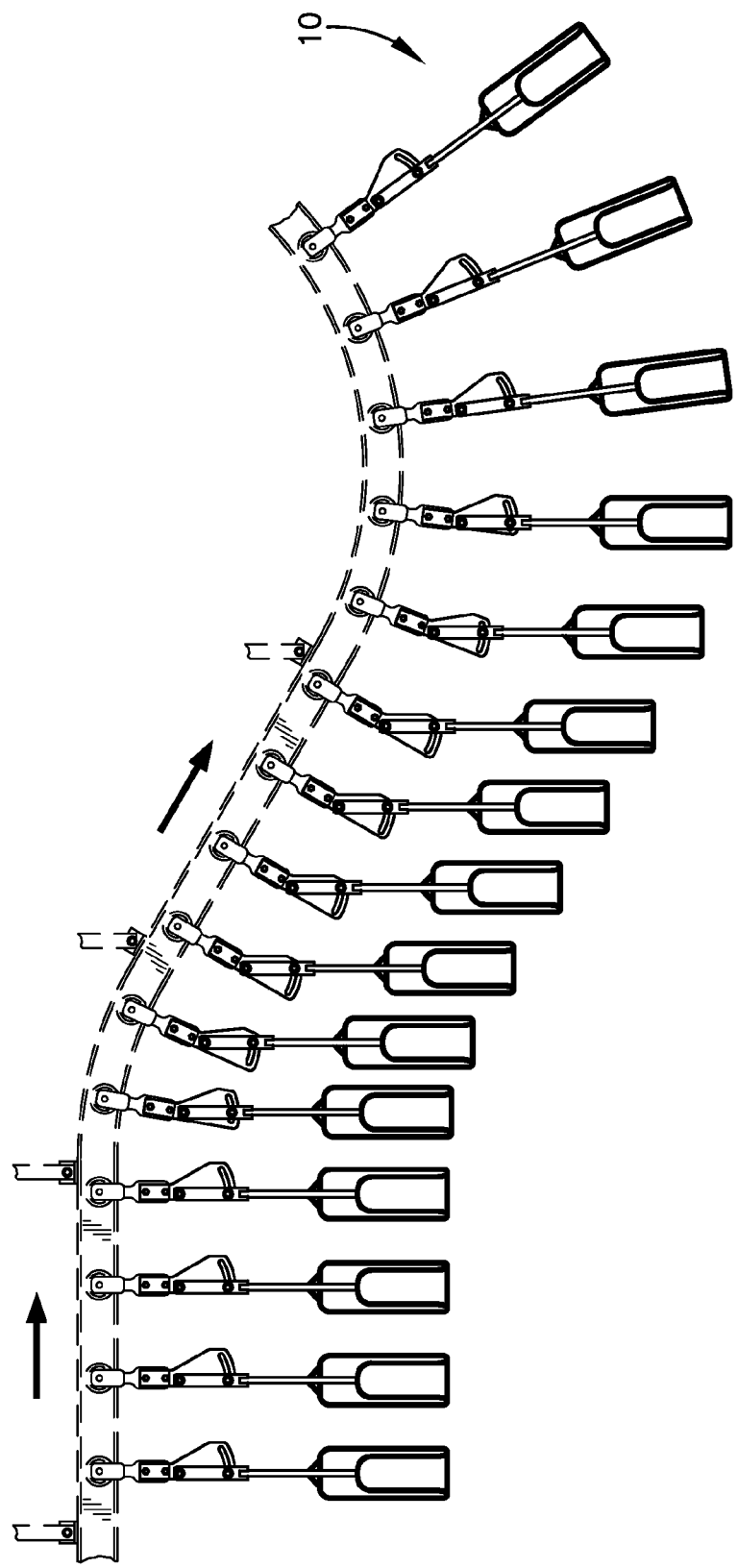
FIG. 18 is a side elevation depiction of the shackle of the present invention in operation traveling along a varying path.

Thus, in all of its various embodiments, the shackle allows substantially little or no change of orientation, beyond a return to a straight orientation, and allows limited change of orientation, between straight and angled, as shown in FIG. 18 and the upper portion is substantially perpendicular to the conveyor system, as shown in FIGS. 5-7.

Although the invention has been disclosed with reference to various particular embodiments, it is understood that equivalents may be employed and substitutions made herein without departing from the scope of the invention as recited in the claims.

Having thus described the preferred embodiment of the invention, what is claimed as new and desired to be protected by Letters Patent includes the following:

1. A shackle for retaining a poultry animal on a conveyor system for moving the poultry animal in a forward direction, the shackle comprising:
   an upper portion operable for conveyance by the conveyor system;
   a lower portion including stirrups operable to receive and retain the legs of the poultry animal, the lower portion being movably attached to the upper portion; and
   a stop defining at least one position in which the lower portion and the upper portion are in a substantially straight orientation relative to each other.

2. A shackle for retaining a poultry animal on a conveyor system for moving the poultry animal in a forward direction, the shackle comprising:
   a lower portion including a pair of stirrups operable to receive and retain the legs of the poultry animal;
   a leg extending upwardly from the lower portion; and
   an upper portion operable for conveyance by the conveyor system, the lower portion being movably attached to the upper portion, and
   wherein the leg contacts a portion of the conveyor system and defines a position in which the lower portion and the upper portion are in a substantially straight orientation relative to each other.

3. An animal retention device for coupling to a conveyor system, the device comprising:
   a first stirrup and a second stirrup operable to receive and retain an animal;
   a suspension member substantially rigidly coupled to the first stirrup and the second stirrup, the suspension member having a stop; and
   the stop defining at least one position of the device.

4. The device according to claim 3, wherein the device is configured to be coupled to a pivot mechanism, the pivot mechanism coupled to a conveyor system, and the pivot mechanism operable for relative movement between two positions.

5. The device according to claim 3, wherein the device is configured to be coupled to a pivot mechanism, the pivot mechanism coupled to a conveyor system, and the pivot mechanism operable to define two positions.

6. The device according to claim 3, wherein the device is configured to be coupled to a pivot mechanism, the pivot mechanism coupled to a conveyor system, and the pivot mechanism operable to control the orientation of an animal during travel on the conveyor system.

7. A conveyor system for retaining and moving animals in a forward direction for processing, the system comprising:
- a plurality of independent shackles in series, wherein the plurality of independent shackles are chainless,
- at least one change in elevation, through which the plurality of independent shackles maintain a substantially vertical orientation,
- a second change in elevation which is an upward incline and the plurality of independent shackles maintains an orientation substantially perpendicular to the conveyor system.

8. The conveyor system according to claim 7,
- wherein at least one of the plurality of shackles is associated with a spacing mechanism operable to keep the plurality of shackles separated during the at least one change in elevation, and
- the spacing mechanism is coupled to the conveyor system and is associated with a stop to define at least one position of the at least one of the plurality of shackles.

9. The conveyor system according to claim 7, wherein at least one of the plurality of independent shackles comprising:
- a lower portion operable to retain the animal,
- wherein the lower portion comprises first and second stirrups;
- an upper portion operable for conveyance by the conveyor system, and the upper portion attachable to the lower portion,
- wherein the lower portion and the upper portion are operable for relative movement between—
  - (a) a first position in which the lower portion and the upper portion are in a substantially straight orientation relative to each other, and
  - (b) a second position in which the lower portion and the upper portion are in a substantially angled orientation relative to each other;
- the lower portion substantially inhibited from moving in a rearward direction beyond an orientation in which the lower portion is substantially straight relative to the upper portion.

10. A conveyor system for retaining and moving animals in a forward direction for processing, the system comprising:
- a plurality of independent shackles in series, wherein the plurality of independent shackles are devoid of a spacing chain,
- at least one change in elevation, through which the plurality of independent shackles maintains a substantially vertical orientation,
- a second change in elevation which is an upward incline and the plurality of independent shackles maintains an orientation substantially perpendicular to the conveyor system.

11. A conveyor system for retaining and moving animals in a forward direction for processing, the system comprising:
- a plurality of independent shackles in series, wherein the plurality of independent shackles are associated solely by a transport system,
- at least one change in elevation, through which the plurality of independent shackles maintains a substantially vertical orientation, and
- a second change in elevation which is an upward incline and the plurality of independent shackles maintains an orientation substantially perpendicular to the conveyor system.

\* \* \* \* \*

UNITED STATES PATENT AND TRADEMARK OFFICE
CERTIFICATE OF CORRECTION

PATENT NO. : 8,137,168 B2  
APPLICATION NO. : 12/857390  
DATED : March 20, 2012  
INVENTOR(S) : Frank J. Criscione, II and William Randall Armstrong Page 1 of 1

It is certified that error appears in the above-identified patent and that said Letters Patent is hereby corrected as shown below:

In the Claims

Column 7, Claim 7, line 12, after 'orientation,' insert -- and --.

Column 8, Claim 10, line 18, after 'orientation,' insert -- and --.

Signed and Sealed this  
Seventh Day of July, 2015

Michelle K. Lee  
*Director of the United States Patent and Trademark Office*